C. G. HANES.
COTTON CHOPPER.
APPLICATION FILED MAY 15, 1909.
950,481.
Patented Mar. 1, 1910.
4 SHEETS—SHEET 2.
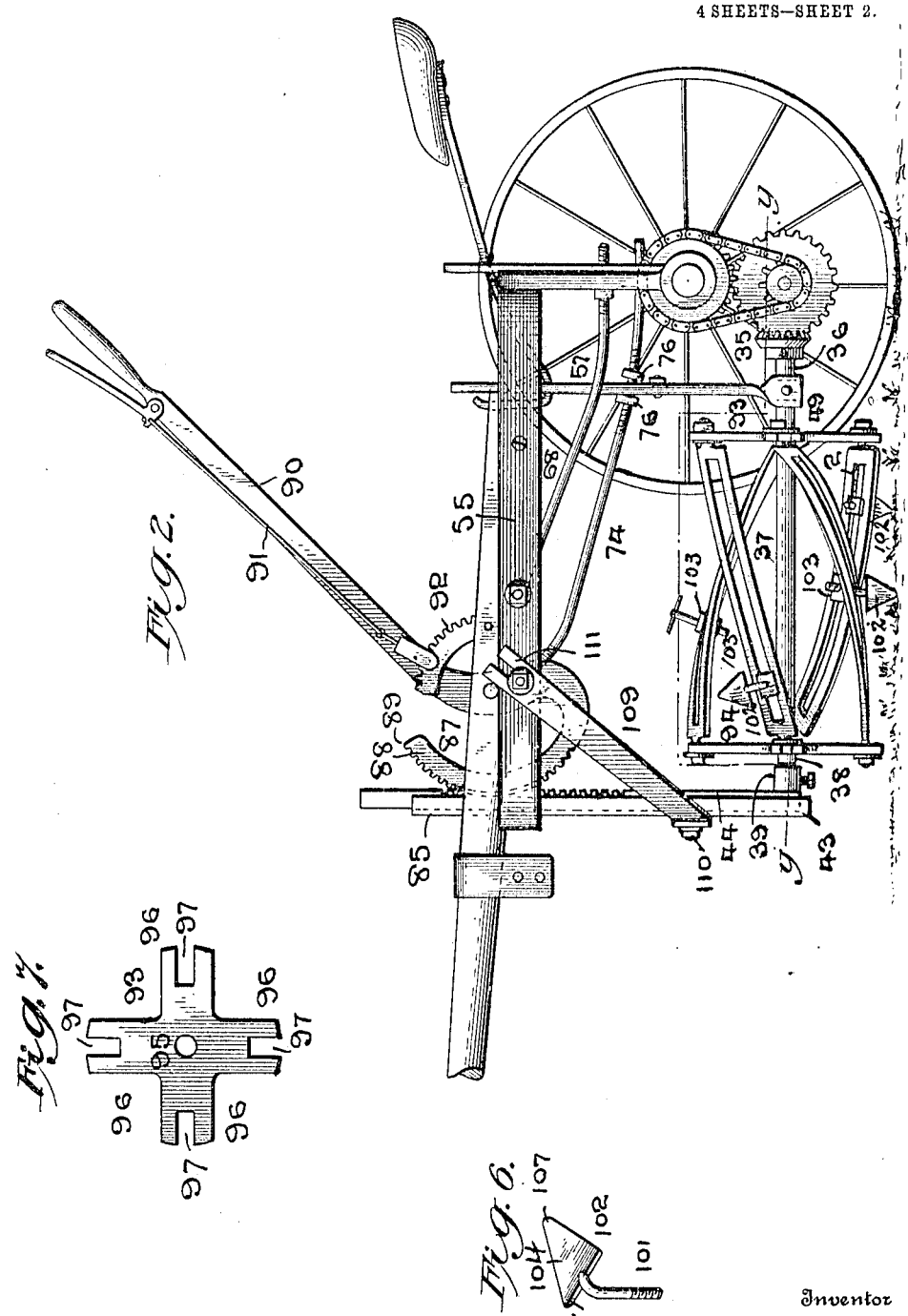
Witnesses
M. Robson
Thos. W. Riley
Inventor
Christopher G. Hanes
By
N. H. Singleton
Attorney C. G. HANES.
COTTON CHOPPER.
APPLICATION FILED MAY 15, 1909.
950,481.
Patented Mar. 1, 1910.
4 SHEETS—SHEET 3.
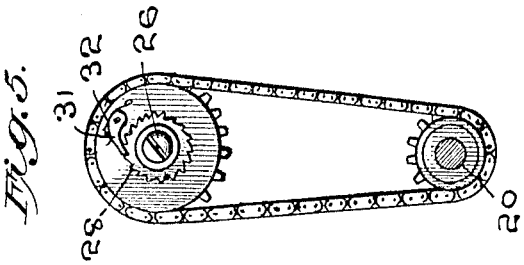
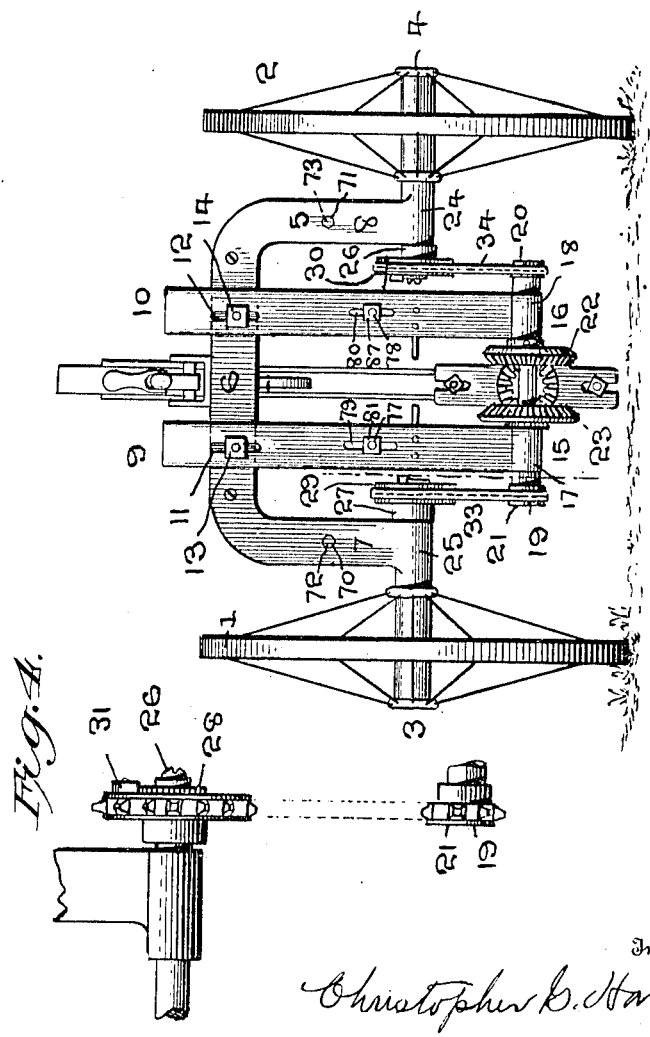
Witnesses
M. Robson.
Thos. W. Cauley
Inventor
Christopher G. Hanes
By W. H. Singleton
Attorney

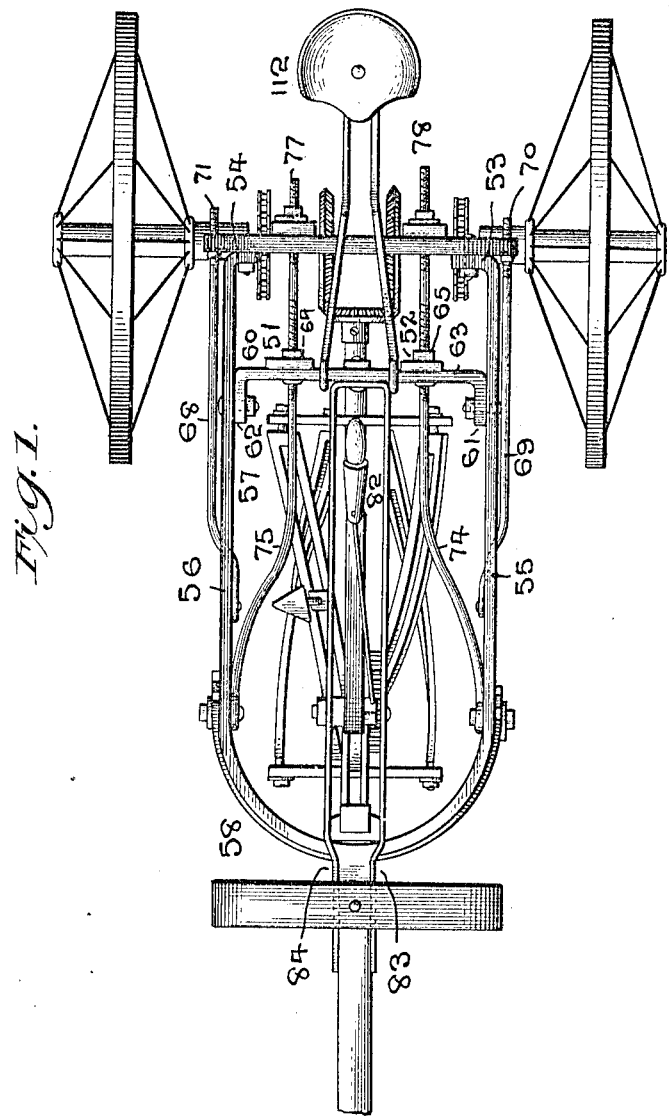

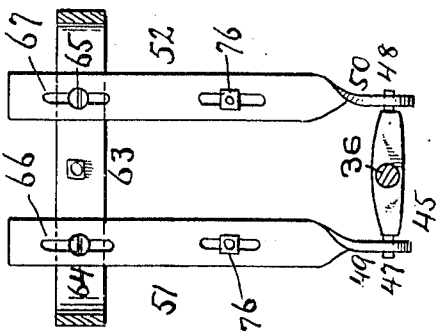
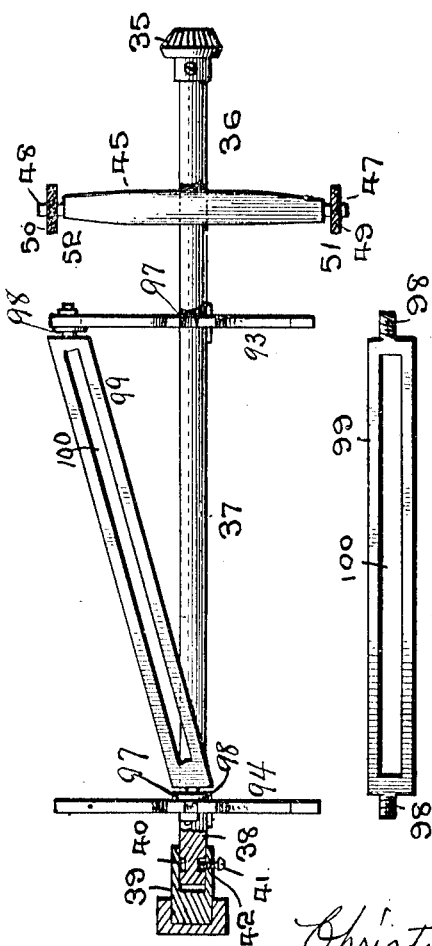

UNITED STATES PATENT OFFICE.

CHRISTOPHER G. HANES, OF LOUIS, OKLAHOMA.

COTTON-CHOPPER.

950,481.

Specification of Letters Patent.

Patented Mar. 1, 1910.

Application filed May 15, 1909. Serial No. 496,301.

*To all whom it may concern:*

Be it known that I, CHRISTOPHER G. HANES, a citizen of the United States, residing at Louis, in the county of Greer and State of Oklahoma, have invented certain new and useful Improvements in Cotton-Choppers, of which the following is a specification.

This invention relates to new and useful improvements in cotton choppers and has for its object, primarily, to produce a cotton chopper which may be used in a cotton field whatever may be the character of the ground, however rough or disposed.

The invention consists principally in the arrangement of the hoes or cutting blades so that they may be adjustable longitudinally and also to and from the center.

It also relates to the adjustability of the frame itself so that it may be adapted to uneven ground; also to mechanism by which the chopping mechanism may be thrown in and out of gear with the driving mechanism.

In the accompanying drawings: Figure 1 represents a top or plan view of the entire device; Fig. 2 represents a side view of the device with one of the traction wheels removed; Fig. 3 represents a rear view of the device with the seat removed; Fig. 4 represents an enlarged detail of the driving mechanism between a traction wheel and the chopper mechanism; Fig. 5 represents another view of the same driving mechanism; Fig. 6 represents a detailed view of one of the cutting devices or hoes; Fig. 7 represents an end view of a cylinder head; Fig. 8 represents a detail, partly in section, of a portion of the chopper mechanism; Fig. 9 represents a top view of one of the longitudinal bars of the chopper cylinder. Fig. 10 represents an enlarged perspective view of a portion of the cotton chopping frame vertically adjusting mechanism. Fig. 11 represents a detail.

In these drawings: The numerals 1 and 2 represent ordinary traction wheels which are securely fastened to axle arms 3 and 4 which are journaled in the lower ends of an arched axle frame 5 having a middle arch 6 and sides 7 and 8. Depending from and secured to the middle face of the arched axle frame 5 are two vertical bars 9 and 10, which are spaced apart from each other and also spaced away from the sides 7 and 8 of the arched axle frame 5. At the middle arch 6, the depending bars 9 and 10 have the slots 11 and 12, through which slots there passes the adjusting binding screws 13 and 14 by which slotted and screw connection the depending bars 9 and 10 are held vertically adjustable to the arched axle frame 5.

At their lower ends 15 and 16, the vertical bars 9 and 10 have bearings 17 and 18. In these bearings 17 and 18 are held the rotatable shaft 19 having at its ends the sprocket wheels 20 and 21 on the outside of the vertical bars 9 and 10. On the inside of the vertical bars 9 and 10 there is placed upon the shaft 19 two miter wheels 22 and 23 spaced apart from each other, one of such wheels, as 22, being made fast to the shaft 19 and permanent thereon, and the other, 23, loose thereon with just sufficient play to permit it to run loose upon the shaft 19, but without any appreciable longitudinal movement upon the shaft. The axle arms 3 and 4 project through the lower ends 24 and 25 of the arched axle frame 5, and on their inner ends 26 and 27 there is fastened a ratchet wheel 28. Loosely sleeved on these inner ends 26 and 27 are sprocket wheels 29 and 30 having on one face a spring pawl 31, this spring pawl 31 being in the path of the teeth of the ratchet wheel 28 and normally held in engagement with said teeth by the spring 32. Extending from the sprocket wheels 29 and 30 to the sprocket wheels 20 and 21 are endless chains 33 and 34 by which power is communicated from the sprocket wheels 29 and 30 to the sprocket wheels 21 and 20. In front of the plane of the arched axle frame 5 and coming between the teeth of the two mitered wheels 22 and 23 is a bevel wheel 35 fastened to the rear end 36 of the longitudinal shaft 37, the front end 38 of which is received into a box 39. In this box 39, the end 38 of the shaft 37 is provided with an annular groove 40 and a screw 41 passes through the box 39, the inner end 42 of the screw 41 resting in the groove 40 of the shaft 37. This box 39 is secured to the lower end 43 of a vertical bar 44. At its rear end 36, the longitudinal bar 37 passes loosely through a rocker bar 45 having at each end the journals 47 and 48. These journals 47 and 48 of the rocker bar 45 are held loosely in the lower ends 49 and 50 of vertical bars 51 and 52, substantially in line with the vertical bars 9 and 10 and in front thereof. Secured to the top of the arched axle frame 5 near each end are the ends 53 and 54 of the side bars 55 and 56 of the top or main frame 57, which has the front curved end 58. In front of the top 6 of the arched axle frame 5 and spaced apart therefrom a bar 60 is secured by its ends 61 and 62 to the sides 55 and 56 of the main frame 57, the transverse or main portion 63 of the bar 60 being in line with the vertical bars 51 and 52. These vertical bars 51 and 52 are held adjustably to the main portion 63 of the bar 60 by means of bolts 64 and 65 which pass through holes 66 and 67 in the tops of the vertical bars 51 and 52. Extending from the sides 55 and 56 are brace rods 68 and 69, the lower ends 70 and 71 of which pass through holes 72 and 73 in the sides 7 and 8 of the arched frame 5. Similar braces 74 and 75 are secured to the front end of the sides 55 and 56 of the frame 57, and passing through the holes in the vertical bars 50 and 51 where they are held by nuts 76, have their lower ends 77 and 78 passing through slots 79 and 80 in the vertical bars 9 and 10 where they are held by nuts 81. Secured to the middle of the main portion 63 of the cross bar 60 are the inner ends of a loop frame 82, the front ends 83 and 84 of which are secured to the front 58 of the main frame 57. Secured between these inner ends 83 and 84 is the upper end 85 of a vertical angle bar or channel in which fits and plays the vertical bar 44. This vertical bar 44 is provided on the inner side of a portion of its length with a series of teeth 86. Pivoted between the sides of the loop frame 82 is the curved rack 87 having the front curved portion 88 with teeth 89 alined as for engagement with the teeth 86 of the bar 44. This curved rack 87 has the handle 90 extending vertically and secured to said handle 90 is a locking detent 91, which engages with the stationary curved rack 92 secured to one side of the loop frame 82.

Between the vertical bars 51 and 52 and the box 39 there are keyed to the longitudinal shaft 37 the cylinder heads 93 and 94. These cylinder heads consist of a center 95 and projecting therefrom a number of radial arms 96. In the present instance there are shown four. Each of these radial arms 96 has a radial notch 97. These cylinder heads 93 and 94 are secured to the longitudinal shaft 37 so that the radial arms of one cylinder head are in line with the radial arms of the other. In each notch 97 there is placed and secured the reduced end 98 of a longitudinal bar 99 having a longitudinal slot 100. These bars 99 are adjustably held in the notches 97 of the cylinder heads 93 and 94 by nuts secured on the projecting ends of such bars 99. These bars 99 are made with a twist, which is clearly shown in Fig. 2 of the drawings. It will be seen that this twist is of such a nature that one end of a bar is secured to one radial arm of one cylinder head, and the bar passing with a longitudinal twist has its other end secured to the next radial arm of the other cylinder head out of line with the arm of the first cylinder head to which its other end is secured, as is clearly shown in Fig. 2 of the drawings. In the slot 100 of each bar 99 there is secured the shank 101 of the cutter or hoe 102, being held adjustably in such slot by the adjusting nuts 103 one on each face of the bar 99. These hoes 102 have a triangular shaped head 104, the broad base 105 being secured to a shank 101, and the sharp cutting point 107 being the working edge of the hoe.

Curved braces 109 may be secured at their lower ends 110 to the channel 85 and have their upper ends 111 adjustably secured to the sides 55 and 56 of the main frame 57.

This device is, of course, provided with the usual seat 112.

Operation: In preparing to transport the cotton chopper to the field, pressure is applied to the handle 90 and through the rack 87 and rod 44, the front end of the chopper mechanism is raised, which throws the bevel wheel 35 out of engagement with the miter wheels 22 and 23 and raises the hoes 102 from the ground, the shaft 36 turning in the rock bar 45, this last also turning on its ends 47 and 48 in the vertical bars 49 and 50. In this elevated position, the chopper frame is held by the detent 91 engaging the rack 92. On arriving at the place where the device is to be used, the detent 91 is released from the rack 92 and the chopper frame permitted to assume its normal position. So far as the actual operation of chopping is concerned, the device is used in the usual way.

By the construction of the curved slotted bars and the radial adjustment of the choppers on such bars, there is provided a wide range of adjustment. The holes may be moved to and from the center of the chopper cylinder and lengthwise thereof, thus placing the holes in a great variety of positions in relation to one another. In this way, almost every conceivable adjustment of the four hoes may be made, that is, they may be placed together and close to the shaft or far apart and far from the shaft so as to accommodate them for different ideas of the operators of the device, and as they may desire the cotton to be thinned more or less.

By having one of the miter wheels loose, the main shaft is held steadily in place and the tendency of the fixed miter wheel to throw the end of the shaft out of line is counteracted and also thus reduces the friction of the shaft in its bearing.

In places cotton is planted in a furrow or ditch somewhat below the usual level. By means of the adjustment of the four vertical bars 9, 10, 51, and 52, the entire chopper frame may be lowered so as to permit the frame to come down the proper distance in such ditch, while the traction wheels are on the usual level of the ground outside. When such low position of the chopper frame is not needed, by means of this adjustment the chopper frame may be again elevated. As this variation in height would produce a difference in the length of the chains running from one sprocket to another, a link may be taken from or added to the same as the case may require.

Having described my invention, what I claim is:

1. A cotton chopper provided with a frame consisting of a shaft, heads secured thereon, oblique bars secured to such heads and having longitudinal slots, in combination with choppers adjustably held in such slots.

2. A cotton chopper provided with a driving shaft having thereon two gear wheels, one made fast to the driving shaft and permanent thereon, the other loose on said shaft, and a chopper frame having a shaft provided on one end with a gear wheel which meshes with both gear wheels on the driving shaft, and means for throwing the gear wheel on the shaft of the chopper frame into and out of engagement with the gear wheels on the driving shaft.

3. A cotton chopper provided at one end with a driving shaft having thereon two gear wheels, one made fast to the shaft and permanent thereon, the other loose on said shaft, and at the other end provided with a vertical movable rack bar and provided between the two with a chopper frame having a shaft, one end of which is held in the rack bar and the other end of which has a gear wheel meshing with both gear wheels on the driving shaft.

4. A chopper frame having a shaft provided at one end with a bevel wheel and at the other with a groove, in combination with a rock shaft in which the end of the shaft having the bevel wheel is secured, and a socket in which the grooved end is secured, and a screw in such socket extending into such groove.

5. In a cotton chopper, the combination of a pair of traction wheels having separate axles, a ratchet wheel secured to the inner end of each axle, a sprocket wheel loosely held by each axle against a ratchet wheel, the sprocket wheel having pawls to engage the ratchet wheel, a driving shaft having at its ends sprocket wheels, chains extending from these sprocket wheels to the sprocket wheels on the axles, such shaft also having a gear wheel, and a cotton chopper frame having a shaft provided with a gear wheel which engages the gear wheel on the driving shaft.

In testimony whereof I affix my signature, in presence of two witnesses.

CHRISTOPHER G. HANES.

Witnesses:
C. E. FETZER,
G. A. FOLLOTT.